United States Patent
Khan et al.

(10) Patent No.: US 8,044,953 B2
(45) Date of Patent: Oct. 25, 2011

(54) SYSTEM FOR INTERACTIVE 3D NAVIGATION FOR PROXIMAL OBJECT INSPECTION

(75) Inventors: Azam Khan, Ontario (CA); Benyamin Komalo, Ontario (CA)

(73) Assignee: Autodesk, Inc., San Rafael, CA (US)

( * ) Notice: Subject to any disclaimer, the term of this patent is extended or adjusted under 35 U.S.C. 154(b) by 935 days.

(21) Appl. No.: 11/390,306

(22) Filed: Mar. 28, 2006

(65) Prior Publication Data

US 2006/0227134 A1 Oct. 12, 2006

Related U.S. Application Data

(63) Continuation-in-part of application No. 10/183,432, filed on Jun. 28, 2002, now Pat. No. 7,042,449.

(51) Int. Cl.
*G06T 17/00* (2006.01)
(52) U.S. Cl. ........ 345/420; 345/427; 345/619; 345/629; 345/947; 345/649; 715/700; 715/848; 715/850; 715/858
(58) Field of Classification Search .................. 345/418, 345/419, 594, 620, 653, 420, 427, 474, 619, 345/628, 629, 647, 648, 649, 676; 382/284; 715/500.1, 700, 848, 849, 850
See application file for complete search history.

(56) References Cited

U.S. PATENT DOCUMENTS

| | | | | |
|---|---|---|---|---|
| 5,276,785 A * | 1/1994 | Mackinlay et al. | ........... | 345/427 |
| 5,943,056 A * | 8/1999 | Sato et al. | ........... | 345/419 |
| 6,064,389 A * | 5/2000 | Berry et al. | ........... | 345/419 |
| 6,097,393 A * | 8/2000 | Prouty et al. | ........... | 345/419 |
| 6,144,375 A * | 11/2000 | Jain et al. | ........... | 715/251 |
| 6,222,557 B1 * | 4/2001 | Pulley et al. | ........... | 345/622 |
| 6,377,256 B1 * | 4/2002 | Light et al. | ........... | 345/419 |
| 6,640,185 B2 * | 10/2003 | Yokota et al. | ........... | 701/208 |
| 7,038,712 B1 * | 5/2006 | Livingston et al. | ........... | 348/187 |
| 7,058,239 B2 * | 6/2006 | Singh et al. | ........... | 382/284 |
| 7,123,777 B2 * | 10/2006 | Rondinelli et al. | ........... | 382/284 |
| 7,589,732 B2 * | 9/2009 | Burtnyk et al. | ........... | 345/474 |
| 2002/0050988 A1 * | 5/2002 | Petrov et al. | ........... | 345/418 |
| 2002/0075258 A1 * | 6/2002 | Park et al. | ........... | 345/419 |
| 2004/0189802 A1 * | 9/2004 | Flannery | ........... | 348/143 |
| 2004/0210852 A1 * | 10/2004 | Balakrishnan et al. | ........ | 715/856 |
| 2006/0080604 A1 * | 4/2006 | Anderson | ........... | 715/701 |

OTHER PUBLICATIONS

A. Khan, et al., HoverCam: Interactive 3D Navigation for Promixal Object Inspection, Proceedings of the 2005 symposium on Interactive 3D Graphics and Games; Apr. 2005 pp. 1-8.

* cited by examiner

*Primary Examiner* — Andrew Wang
*Assistant Examiner* — Abderrahim Merouan
(74) *Attorney, Agent, or Firm* — Staas & Halsey LLP

(57) ABSTRACT

A system that transitions from freeform camera motion to surface following motion as a surface of an object is approached by clipping the vectors for closest point and look-at point. When the surface is reached and while following the surface the user can designate an up model that sets an up vector to conform the view to a users expectations while the system operates using a local up vector for computations. A restricted surface field of view along with an obstacle field of view can be used by the system to allow the view to traverse cavities and maintain a specified surface following distance from an obstacle, from a wall and from a floor.

2 Claims, 23 Drawing Sheets

SYSTEM FOR INTERACTIVE 3D NAVIGATION FOR PROXIMAL OBJECT INSPECTION

CROSS-REFERENCE TO RELATED APPLICATION(S)

This application is related to and is a continuation-in-part of and claims priority to U.S. application entitled PUSH-TUMBLE THREE DIMENSIONAL NAVIGATION SYSTEM having Ser. No. 10/183,432, by Khan, filed Jun. 28, 2002 now U.S. Pat. No. 7,042,449 and incorporated by reference herein.

BACKGROUND OF THE INVENTION

1. Field of the Invention

The present invention is directed to an improved system of push tumble navigation.

2. Description of the Related Art

Surface following can be used to view an object of a scene while inspecting the surface or performing other operations, such as a painting. When users are distant from the object and move toward it, a visual discontinuity can occur when the freeform motion is converted into surface following. When following a surface the closest point on the surface needs to be found so that a constant distance can be maintained. Simple ray casting to locate a closest point can be time consuming. When following a surface the user can also experience a view that is disorienting when some objects are traversed. Users performing surface following can use various types of motion specification. As a surface is being followed variations in the surface including cavities and obstacles can be encountered.

What is needed is a system that can accommodate the above discussed needs.

SUMMARY OF THE INVENTION

It is an aspect of the present invention to provide a transition from freeform navigation to surface following and view navigation.

It is also an aspect of the present invention to reduce the processing time for finding a closest surface point during navigation.

It is another aspect of the present invention to allow the selection of different camera view models that designate the up direction during navigation.

It is a further aspect of the present invention to provide for a pull model for motion and use a local up model for internal calculations.

It is an additional aspect of the present invention to limit view changes for concave surfaces.

It is an aspect of the present invention to look ahead to anticipate obstacles in the navigation path.

The above aspects can be attained by a system that transitions from freeform camera motion to surface following motion as a surface of an object is approached. When the surface is reached and while following the surface the user can designate an up model that will conform the view to a users expectations while the system operates using a particular up direction for computations. A restricted surface field of view along with an obstacle field of view can be used by the system to prevent the camera from behaving unexpectedly at cavities and when encountering obstacles.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
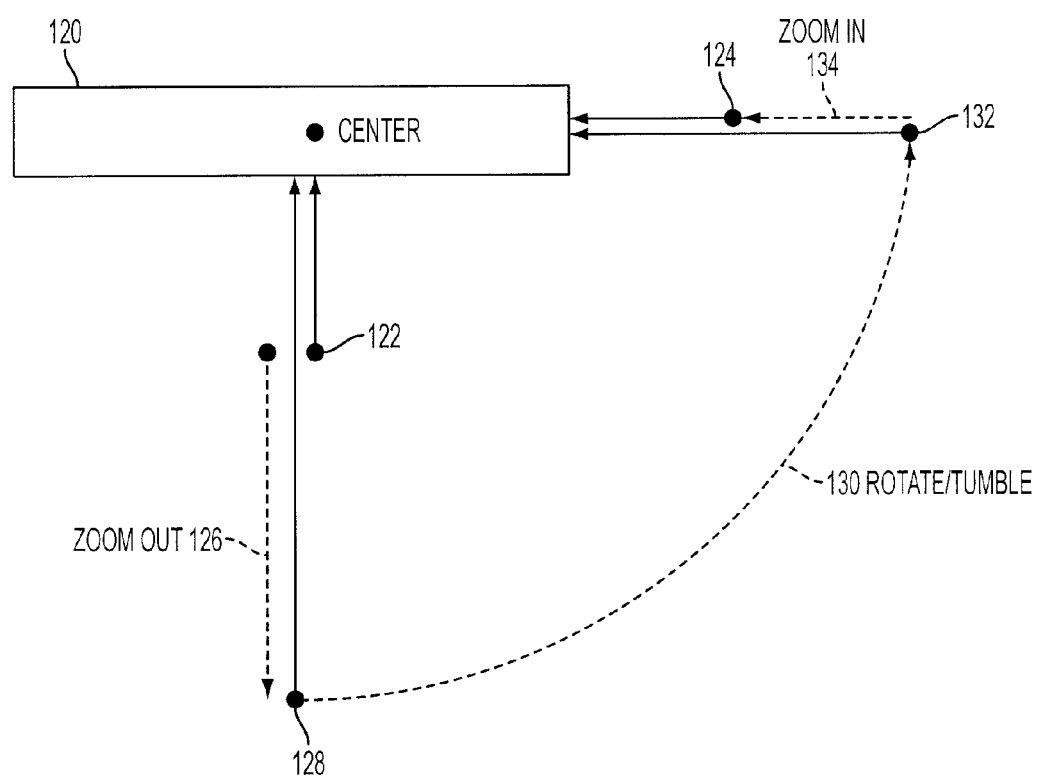
FIG. 1 shows a two-dimensional overhead view of surface following.

The present invention is a system that generates or receives a two-dimensional input, automatically pans a view of a model according to the two-dimensional input, automatically zooms the view according to the two-dimensional input, and automatically tumbles or rotates the view according to the two-dimensional input, where the panning, zooming, and tumbling are relative to a fixed point in the space of the model. The behavior of the invention could be considered to be like a camera that hovers above a surface or a HoverCam. A cylinder is a type of object or model that can be viewed with a viewing system. FIG. 1 shows a two-dimensional overhead view of a three-dimensional cylinder model 120. FIG. 1 also shows a sequence of views 122, 128, 132, 124 of the cylinder model 120. Initial view 122 is a view directed to the side of the cylinder model 120. Final view 124 is a view directed at the end of the cylinder model 120. Typically, several different actions (and thus several different controls) are required to manipulate the view from initial view 122 to the final view 124. The initial view 122 must be zoomed out 126, resulting in the second view 128. The second view 128 must then be rotated 130 to the third view 132. Finally, the third view 132 must be zoomed in 134 to arrive at the final view 124. Additional discussion of and illustrations of the camera view at the views 122, 128, 132, 124 in FIG. 1 can be found in the related application referenced above. This approach of orienting the view to the model object can be applied during all of the navigation by the user within a scene containing the model. However, there may be other objects in a scene and a user may want to perform other types of navigation in the scene when away from the object.

Figure 2:
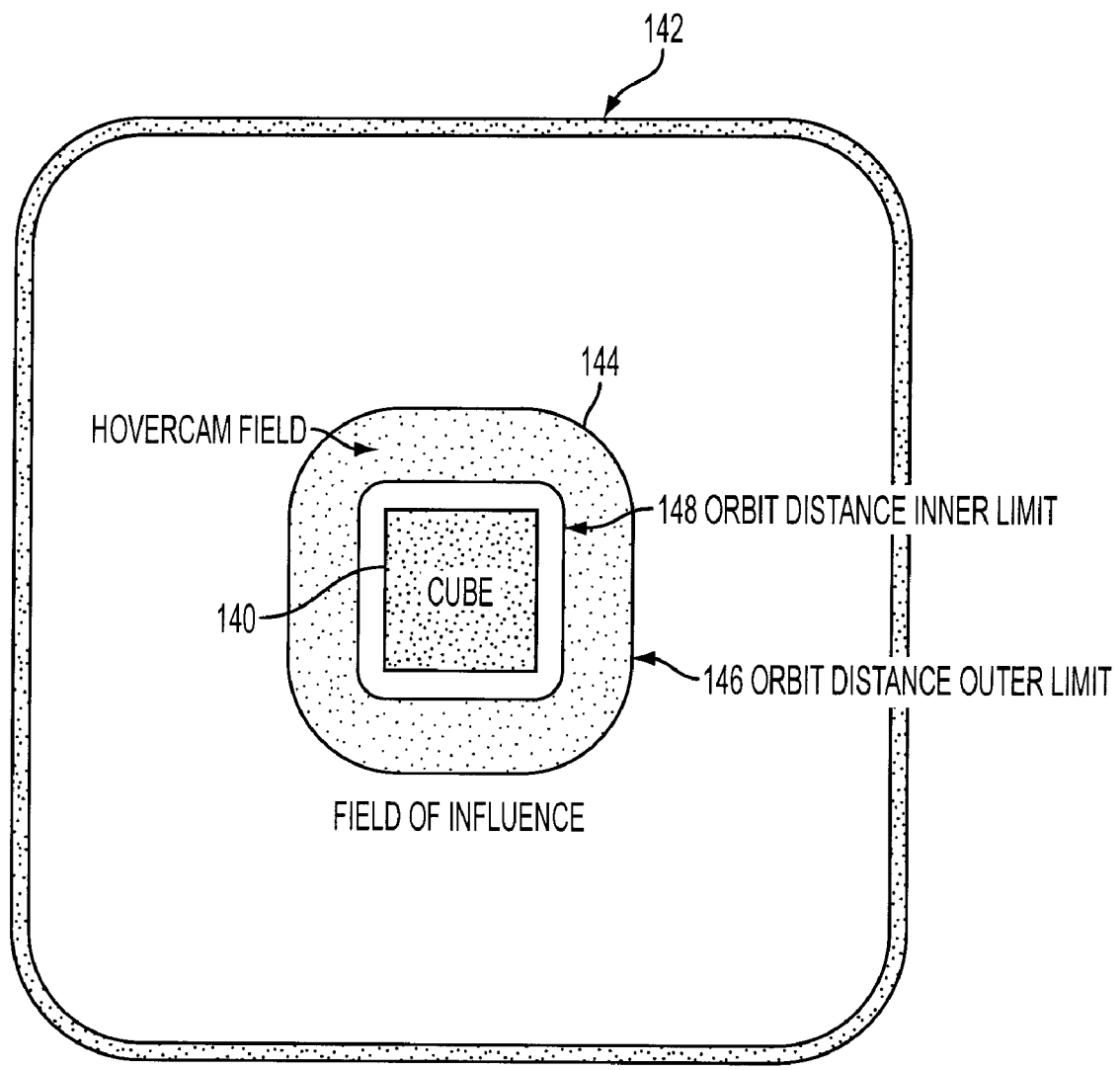
FIG. 2 illustrates a transition field for a blending transition from freeform to surface following.

The navigation discussed above could be used together with traditional freeform navigation tools with the user switching between them as needed. However, it is preferable to interoperate between the various camera techniques in a fairly seamless way. Freeform camera motion allows the user to navigate to any point in space and to face in any direction. For specific surface-based tasks like 3D painting or sculpting, the present invention provides a subset of this freedom with the benefit of following the surface. Switching from surface following, as depicted in FIG. 1, to a freeform camera could simply be invoked by clicking on a tool icon or by a key press. However, switching from a freeform camera to a surface following camera may cause an abrupt reorientation and reposition of the camera because an initial search may find a result quite far from the current view. Two methods can be used to ease this disruption. In the case where a freeform camera approaches a surface of an object 140 from a significant distance, a field of influence 142 around the object (see FIG. 2) specifies how strongly the surface following motion is weighted (preferably linearly interpolated) with the freeform motion. In the case where a freeform camera is already very close to an object, fully within the surface following field 144), motion clipping (as discussed later herein) is applied to smoothly transition to the motion of FIG. 1.

Figure 3:
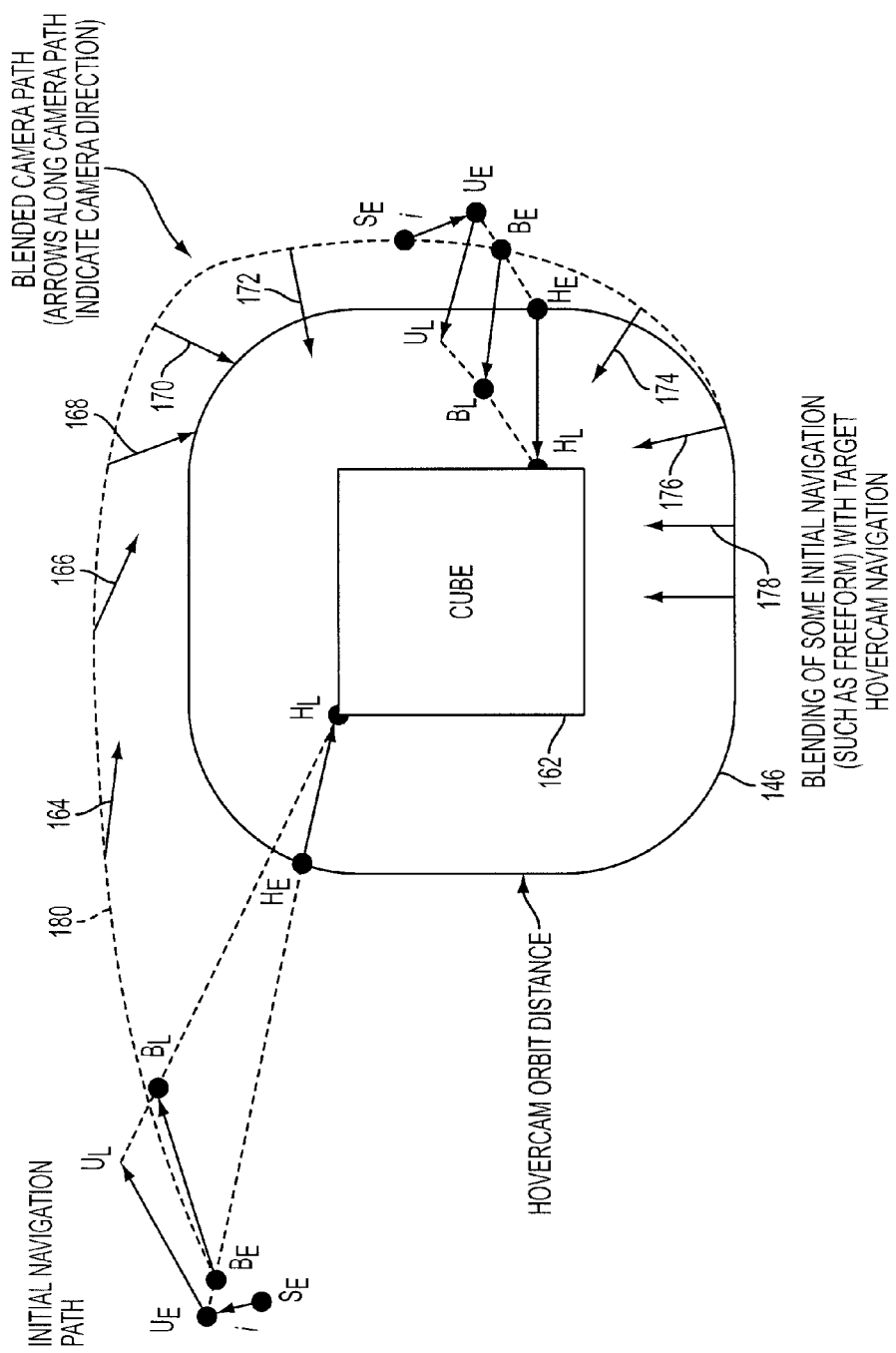
FIG. 3 illustrates view changes during the transition.

The layers of influence 142 and 144 around each object can be automatically generated by, for example, by using a spherical distance from a center of the object to set limit 142 and using the mouse-wheel is used to zoom in or out to specify a new fixed distance 144 for the surface following algorithm. The outer layer 142 is typically quite far from the object 140 surface and specifies a field of influence. Once a freeform camera enters this field, the surface following camera is weighted together with the freeform camera so that the camera view will be pulled towards the outer limit 146 of the orbit distance of the object 162 (see FIG. 3). This pulling is shown in FIG. 3 with arrows 164-178 representing the camera view direction starting out pointing in the direction of travel and gradually turning to face the object perpendicular to the direction of travel. Once the camera is fully controlled by the surface following algorithm, it preferably remains so until the user switches to another navigation method. The surface following camera orbit distance will always be between the inner limit 148 (FIG. 2) and the outer limit 146 unless the user zooms out beyond the field of influence.

In FIG. 3 subscripts E-eye, L-look-a, U-user, H-HoverCam, B-blended and S-"Start" point are used to explain the blending. In this figure second letter of a pair is the subscript, e.g. the HoverCam eye point will be "H-E". In the initial conditions (the details on the left of FIG. 3). "S-E" is the Start-Eye point. For convenience the Start-Look point is not shown because the figure would be too crowded. Now, starting at "S-E", the user creates the "i" vector through a mouse move. This results in the User vector, that is, the vector that the user would like to end up at, the vector "U-E to U-L". However, the HoverCam system computes the desired result, which is "H-E to H-L". Through a clipping operation (e.g. moving part of the way, say 10%, toward a desired result), we get the blended vector "B-E to B-L" (where the clipping will be discussed in more detail later herein). In the next iteration, B-E is the new start position S-E. Again the vector "i" may try to move off the path, a new desired vector will be computed, and the blended vector will basically move the eye back to the path represented by the black dashed line 180. This blending continues until the state is reached on the right side of FIG. 3, with the same situation existing. Starting with the eye at S-E, the user moves the mouse creating the vector "i". In this situation UE-UL is orthogonal to vector "i". The system finds H-E and H-L and blends to get the blended vector "B-E to B-L". Note, the three vectors in this part of the figure (U, B, and H) should really be a lot closer to each other vertically but they are spread apart somewhat for legibility and the "real" H-L would be directly below U-E on the cube wall (as the closest point to U-E) but is drawn further toward the bottom.

Figure 4:
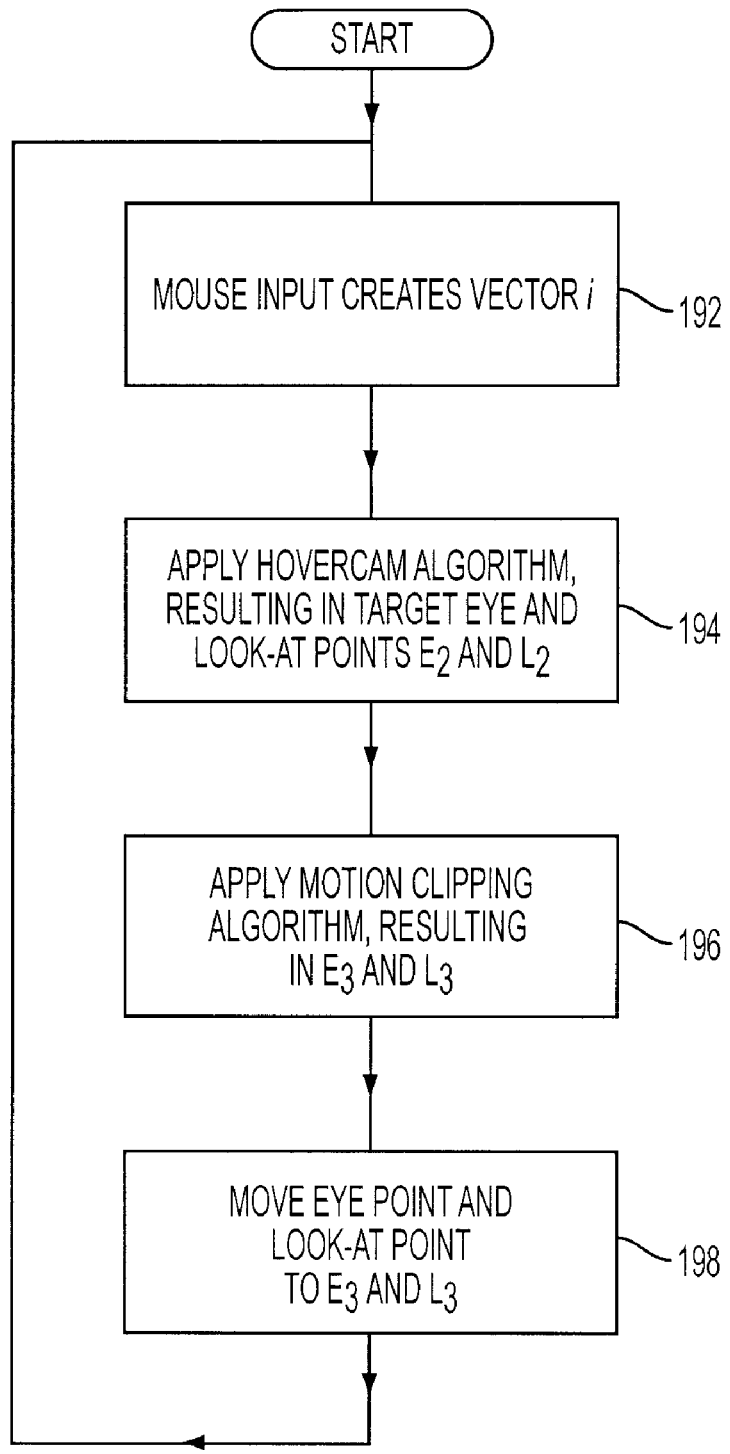
FIG. 4 shows the operations of the blending.
Figure 5:
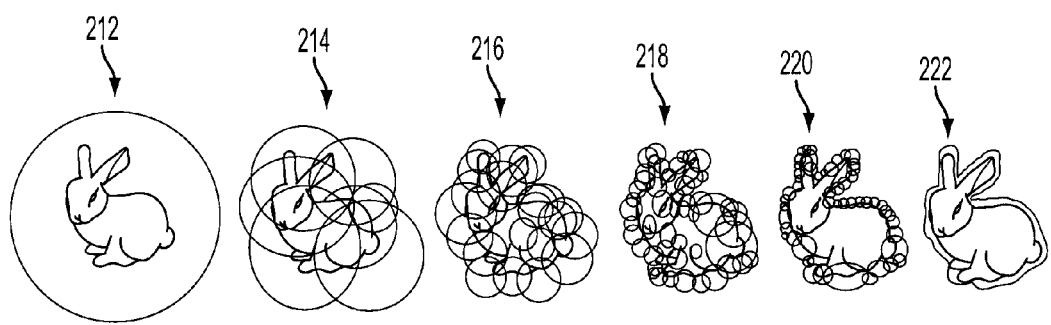
FIG. 5 depicts sphere trees.
Figure 14:
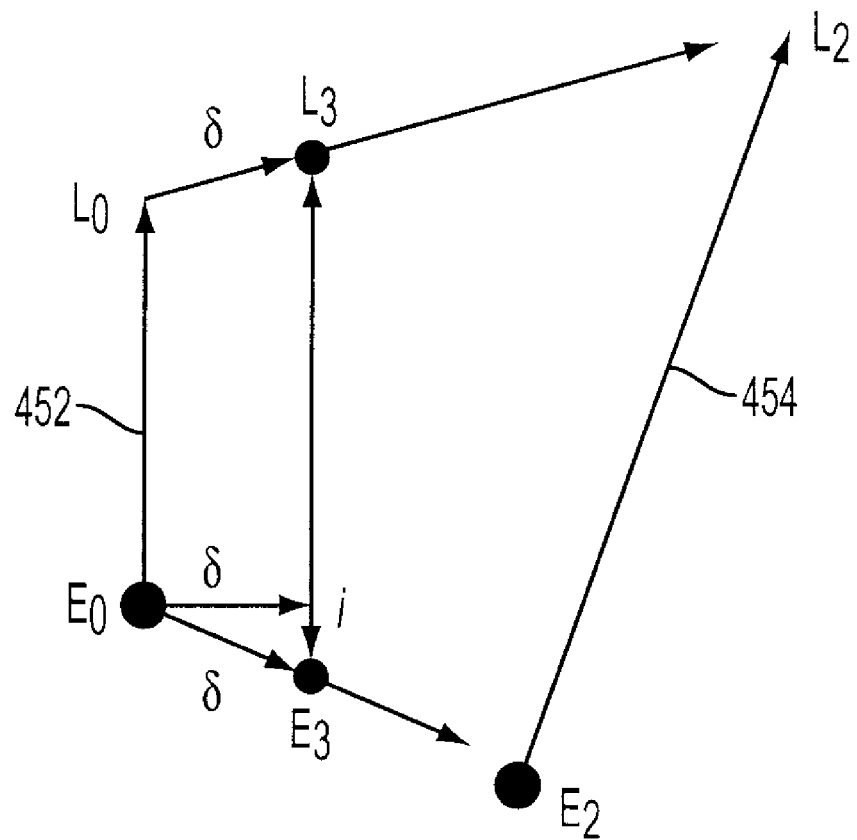
FIG. 14 depicts clipping.

FIG. 4 illustrates how the blending of the freeform camera navigation and the surface following navigation of the present invention occurs (see also FIG. 14). First, a mouse move creates 192 the vector "i". The surface-following process is applied 194 to the motion resulting in target eye and look at points. Then motion clipping is applied 196 to produce new eye target and look at points. Then, the eye point and look at point are moved 198 to these new points. Other types of navigational influences can also be blended using the approach discussed herein When in the surface following mode (inside surface 146) the present invention determines the view direction by determining the closest point on the surface of the model. A 3D model is typically represented as a polygonal mesh. Iterating through every polygon in the model for closest point can determine the closest point in a polygonal mesh. However, such an analysis can be time consuming and may not be suitable for a real-time interactive operation, as is preferred. To reduce the time to find the closest point, preferably, an indexing structure, conventionally called a sphere-tree, is generated when the user loads an object. The sphere-tree is a hierarchal structure that encloses the polygons within the model (see FIG. 5) and is preferably built using a conventional octree algorithm in two passes, one to build the tree and another to tighten the tree. FIG. 5 depicts six successive levels 212-222 of a sphere-tree enclosing a 3D bunny model. Notice how closely the sphere-tree represents the model at the low levels.

To compute an approximate closest point on the surface of the mesh, the system performs (see FIG. 6) a top-down traversal of the sphere-tree, maintaining a list of all the spheres that satisfy the field of view (FOV) constraints that limit the view for closest point determination to be in the direction of motion so that points on the surface that are behind the current position do not cause the camera to turn backward. If a sphere fails to be within either of our FOVs, it is eliminated from the list without exploring any of its children. In this manner, the system eliminates a large majority of the polygons from the closest point analysis. As a further optimization, the systems also finds the distance from the query point to the far end of each sphere, and eliminate all the spheres further than the current minimum distance. The traversal terminates when the bottom of the sphere-tree is reached, and the result is a list of the smallest spheres from the lowest level. The polygons contained within these spheres are then subjected to conventional ray casting closest point analysis.

It is often the case that some of the polygons lie on the boundary of the restricted FOV. For these polygons, if the true closest point is outside the FOV, then the closest point of interest will lie along the intersection of our FOV with the polygon. When this happens, the system performs a ray-casting technique about the perimeter of the FOV, finding the closest intersection of a ray with the polygon. If the search method ignored these cases, the system could mistakenly only select closest points on polygons completely within the FOV.

Figure 6:
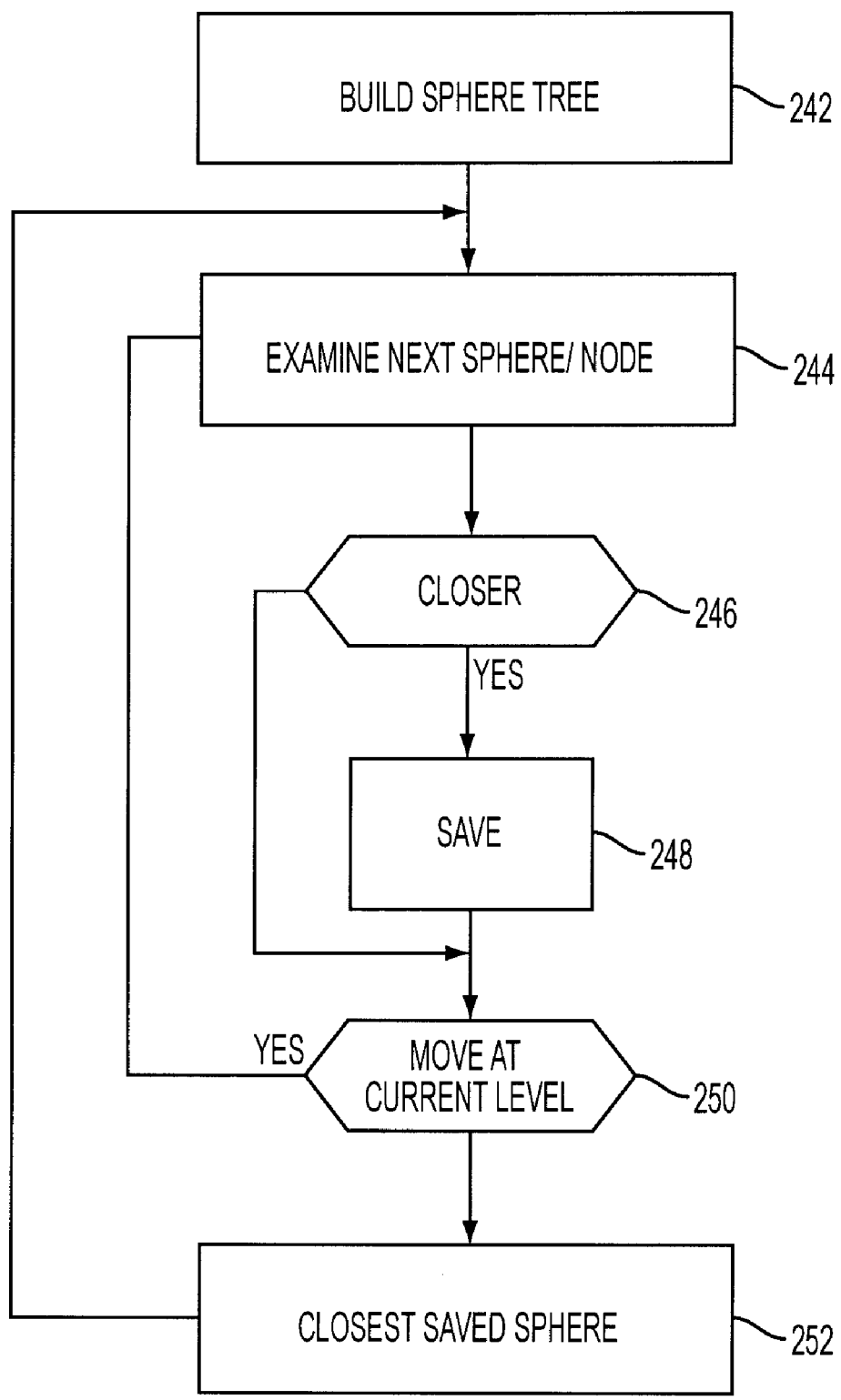
FIG. 6 depicts closest point processing associated with a sphere tree.

As depicted in FIG. 6, a sphere tree is built 242 and a first sphere is designated. The system then the system examines 244 the next sphere to determine 246 if it is closer to the camera. If so, it is saved 248. A determination is made 250 concerning whether more spheres at this level in the tree exist.

If not, the closest saved sphere is selected 252 and the process cycles again (244). In this way a list of spheres that can include the closest point is produced.

In performing a surface following procedure, an up vector is typically implied relative to a view throughout the procedure. However, this can have unexpected consequences, such as when a globe is being navigated and the view traversed the top of the sphere and the sphere, such as a globe of the world, is viewed upside down. When closely inspecting an object, especially in a visually abstract empty virtual environment, the problem of correctly orienting the camera, so objects do not appear to be sideways or upside-down, is a problem. Furthermore, the model chosen to derive the up-vector at a given camera position, or given a certain camera motion, may alter the overall camera metaphor. To solve this problem the present invention defines four up-models: global, local, driving, and custom.

Figure 7:
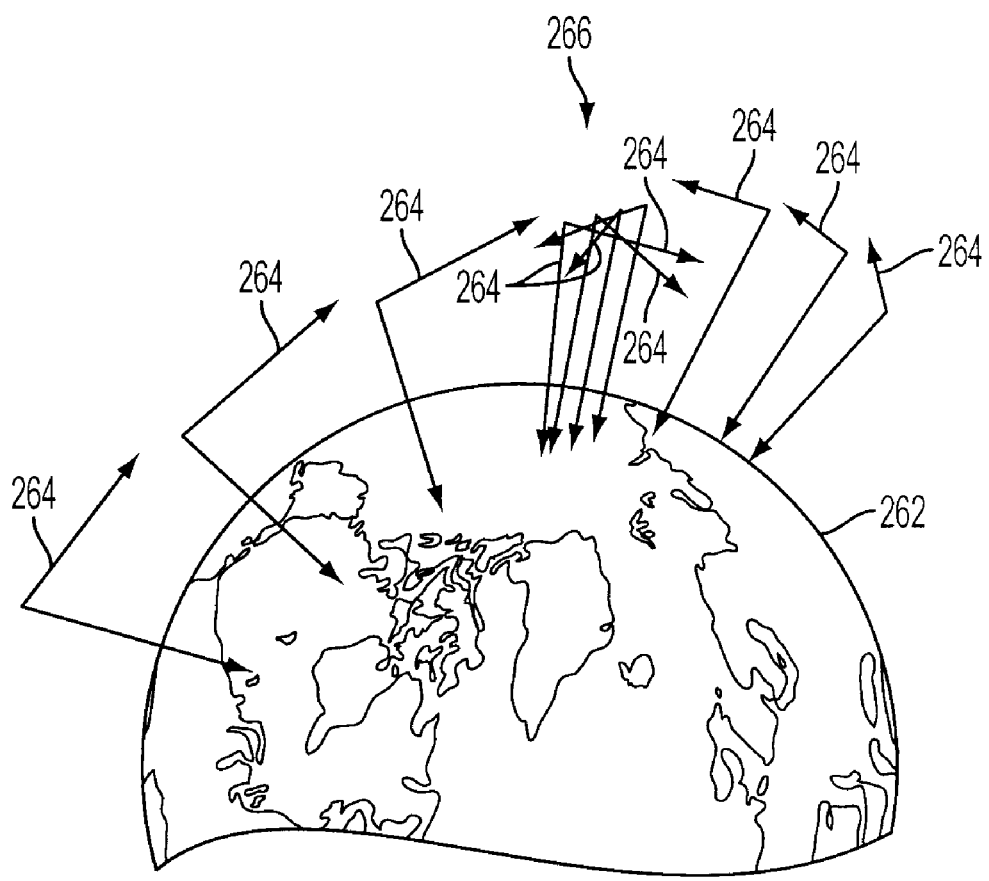
FIG. 7 shows a global up model.

For a global up-vector model, consider a globe 262 (see FIG. 7) representing the earth. Regardless of where the camera may be positioned, or how it moves, up is typically the direction toward the North Pole. For example, whether the user is looking at Australia or Sweden, the camera would be oriented so that the North Pole would be toward the top of the screen. If the user moved across the North Pole from Canada to Russia, the camera would effectively spin about 180° (see the grouped vectors 264 at 266) so that it would come down on the Russian side, but with the North Pole still toward the top of the screen. The constant up-vector 264 high above the center of the scene in FIG. 7 defines the global up-vector model as shown in FIG. 7.

Figure 8:
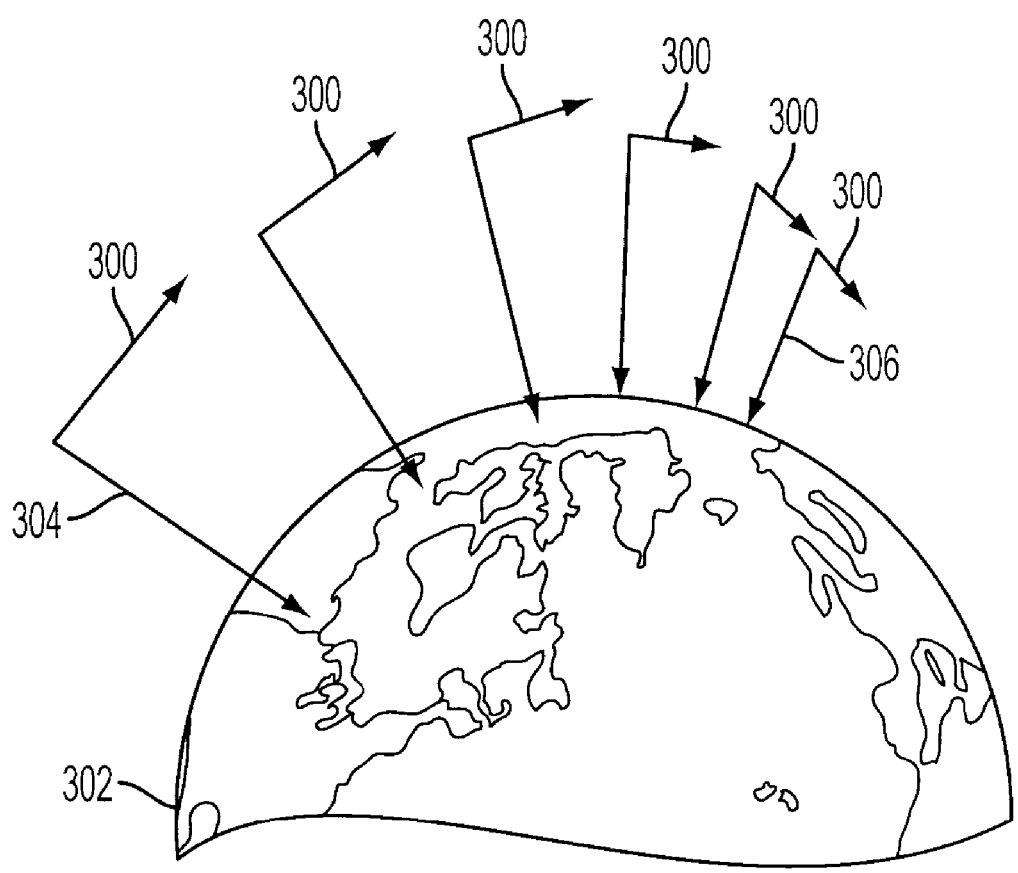
FIG. 8 shows a local up model.

In the egocentric local model, the up-vector 300 is view dependent and always points toward the top of the viewport (see FIG. 8). Therefore, moving the cursor left or right does not affect the up-vector even though the view of the globe 302, for example, as indicated by view vectors 304 and 306, changes. However, moving up or down causes the up-vector to be corrected so that the user never feels as though they have turned. For example, when moving over the North Pole of a globe from Canada to Russia, if Canada initially looked the right way up, Russia would appear upside-down.

Figure 9:
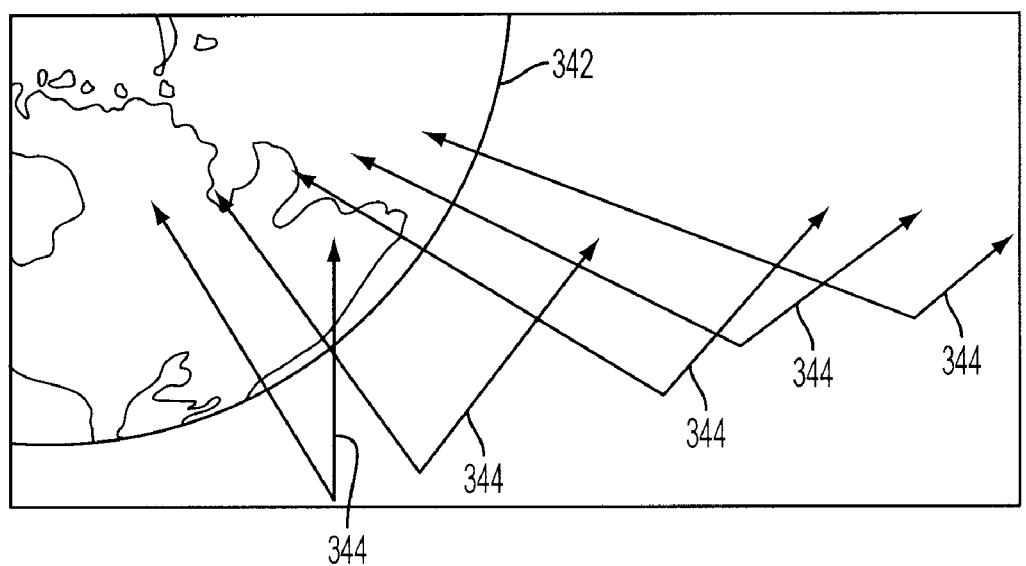
FIG. 9 shows a driving up model.

In the driving model, for some objects, the user may wish to have the feeling that moving the input device left or right should turn the object so that moving (the device) up is always "forward". Again, using the globe 342 as an example (see FIG. 9), if we started over Brazil with the equator horizontal across the view and we moved the input device to the right, the horizon would rotate in the view until vertical, with the North Pole toward the left hand side of the screen. The up vector 344 would rotate to the direction of travel. This model could also be considered for a "flying" camera metaphor since it smoothly banks the camera in the left or right direction of mouse motion.

Figure 10:
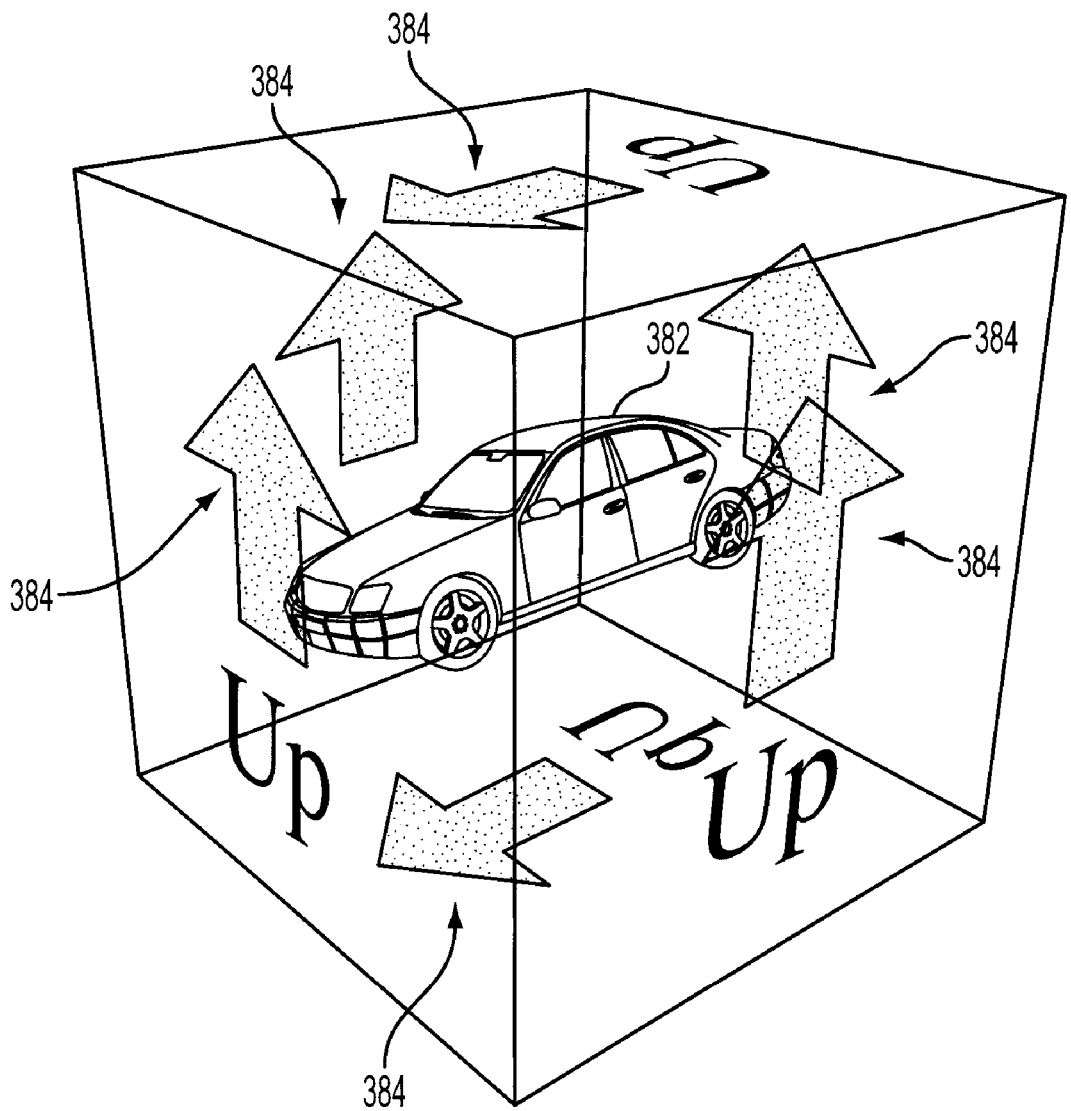
FIG. 10 shows a custom up model.

Some objects may require custom up-vector fields. For example, a model of an automobile 382 (see FIG. 10) would normally have the up-vector point from the car to high above the top of the roof. However, if a user was looking underneath the car or above the car, it may seem proper to have "up" be towards the hood. In this case, custom up-vectors 384 could be placed on the sides of an enclosing cube (see FIG. 10), which would be interpolated based on the current camera position, to determine the current up-vector. Preferably, the user can move to any point in space and press a hotkey to generate an up-vector at the current position and orientation. In this way, a complex up-vector field may be authored.

Figure 11:
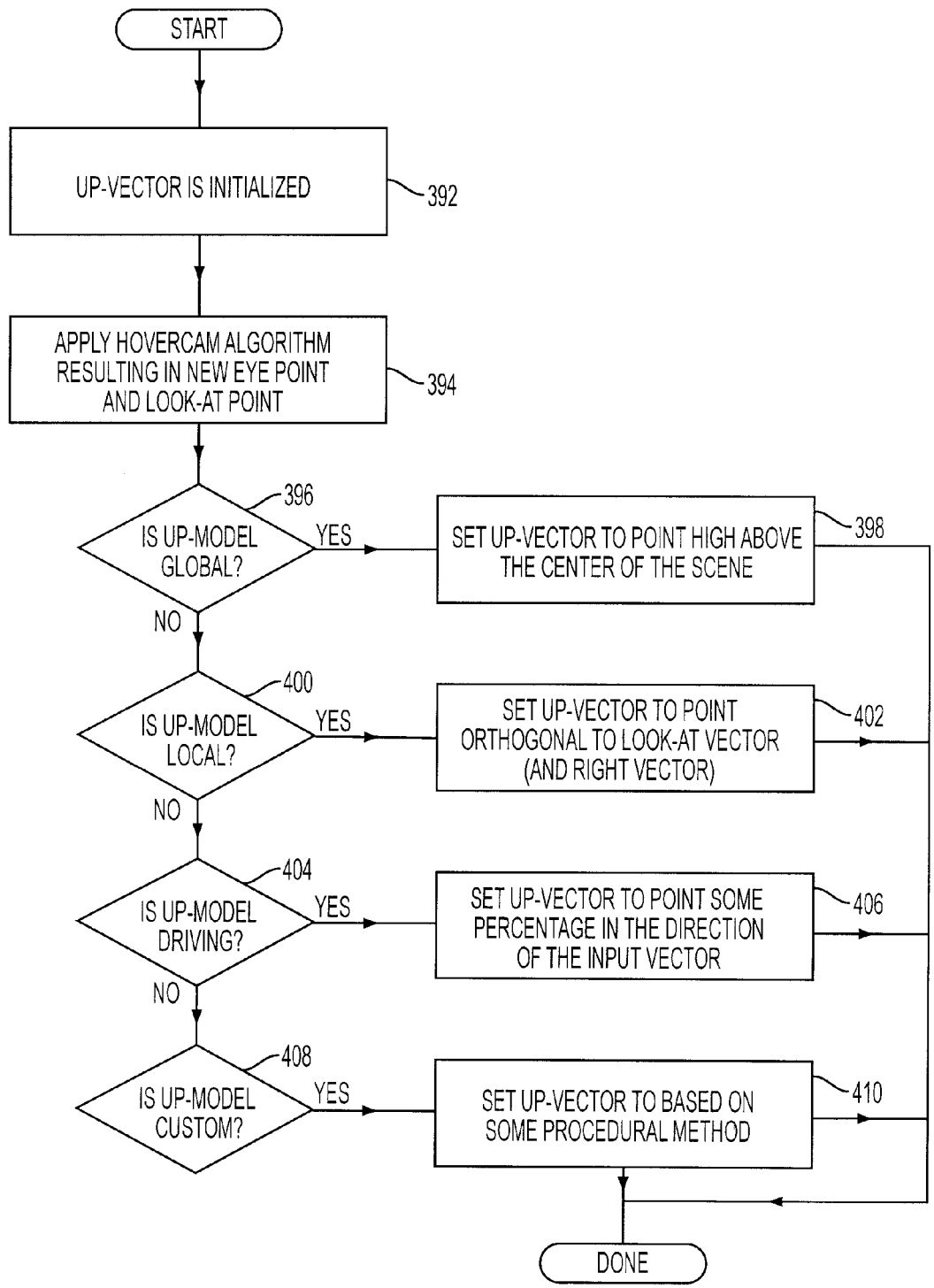
FIG. 11 shows up model processing.

The processing associated with the use of the up models discussed above starts (see FIG. 11) with the initialization 392 of an up vector. The system then applies 394 the surface following processing to obtain eye and look-at points. If the global model has been designated 396, the up vector is set 398 to point high above the center of the scene. If the local model has been designated 400, the up vector is set 402 as orthogonal to the look-at vector. If the model has been set 404 at the driving model, the vector is set 406 toward the input vector direction. If a custom model has been selected 408, the vector is procedurally set 410 (see FIG. 12). The system then uses the vector to perform the display processing.

Figure 12:
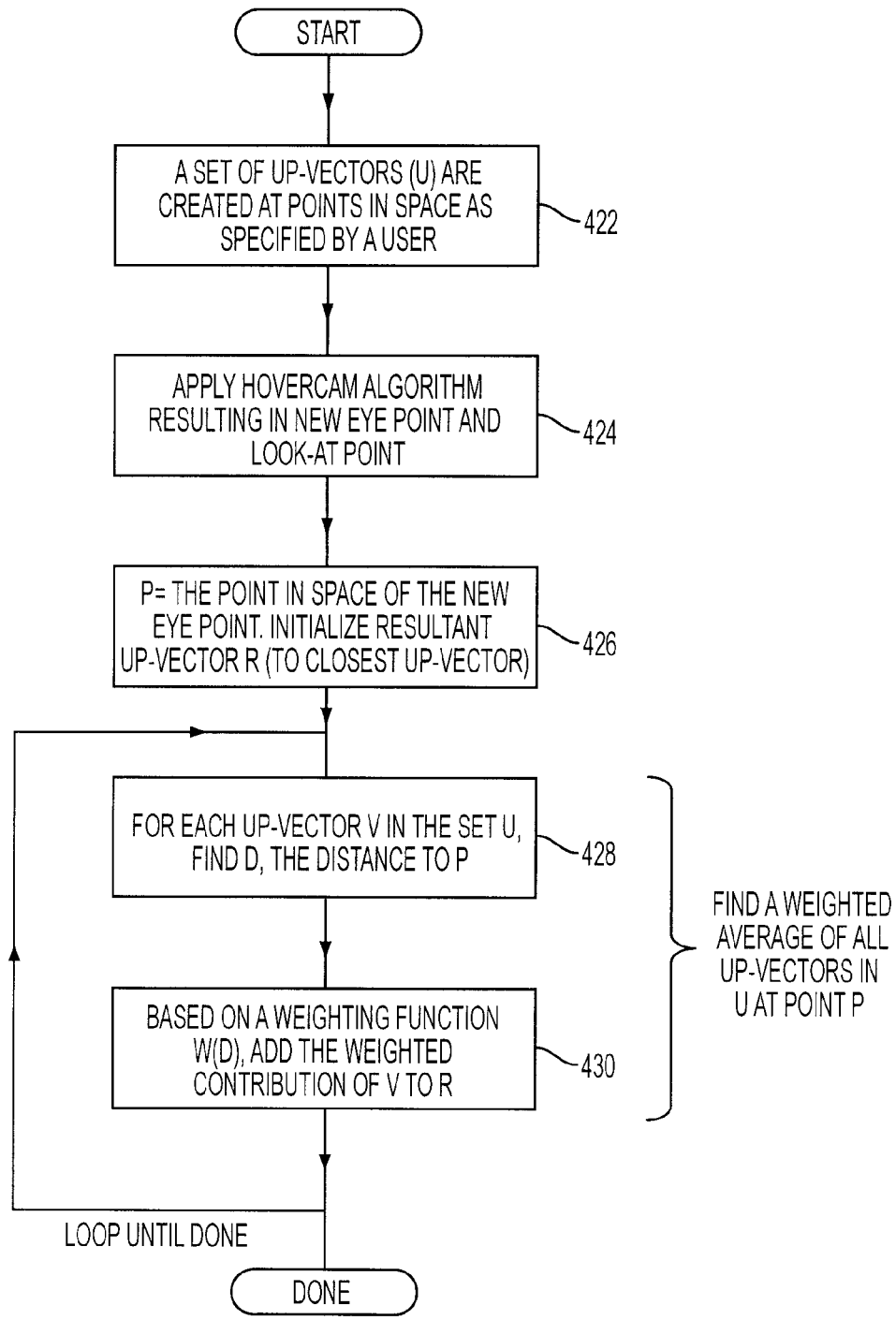
FIG. 12 shows custom up model processing.

In the custom model, the system, as depicted in FIG. 12, one or more vector fields are defined 422 by vectors in positioned in the scene space. Ideally this is a continuous field where a vector is defined for every particular point in space, but this is procedurally costly and to reduce the computation time, discrete vectors are used to define the field. The system applies 424 the surface following procedure to obtain a new eye point in space and the up vector is set 426 to the nearest of the vectors positioned in the scene. The distance to the other up vectors in the scene is determined 428. Then, for any particular point in space, the system compute 430 the target up vector by taking the weighted average of the vectors.

The mapping of mouse motion to camera motion may either be push (egocentric) or pull (exocentric). In a push mapping, the user conceptually pushes the camera so that, for example, moving the mouse from left to right would push the camera to the right causing the model to appear to move left. With a pull mapping, the user pulls the world in the direction of motion so that dragging from left to right moves the object from left to right, achieved by moving the camera to the left.

The invention is like the user is controlling a craft floating above the surface of an object and so one may expect the push mapping to be most effective. However, given the object inspection metaphor, the user is typically expected to be very close to the object so that it fills most of the display. As such, when the user clicks to drag the mouse, the cursor will typically be over the object when the mouse button is clicked. This strongly conveys a metaphor of grabbing the object at that position and dragging it in the mouse direction, which implies that the camera will move in the opposite direction. For this reason, the pull mapping is preferred.

Figure 13:
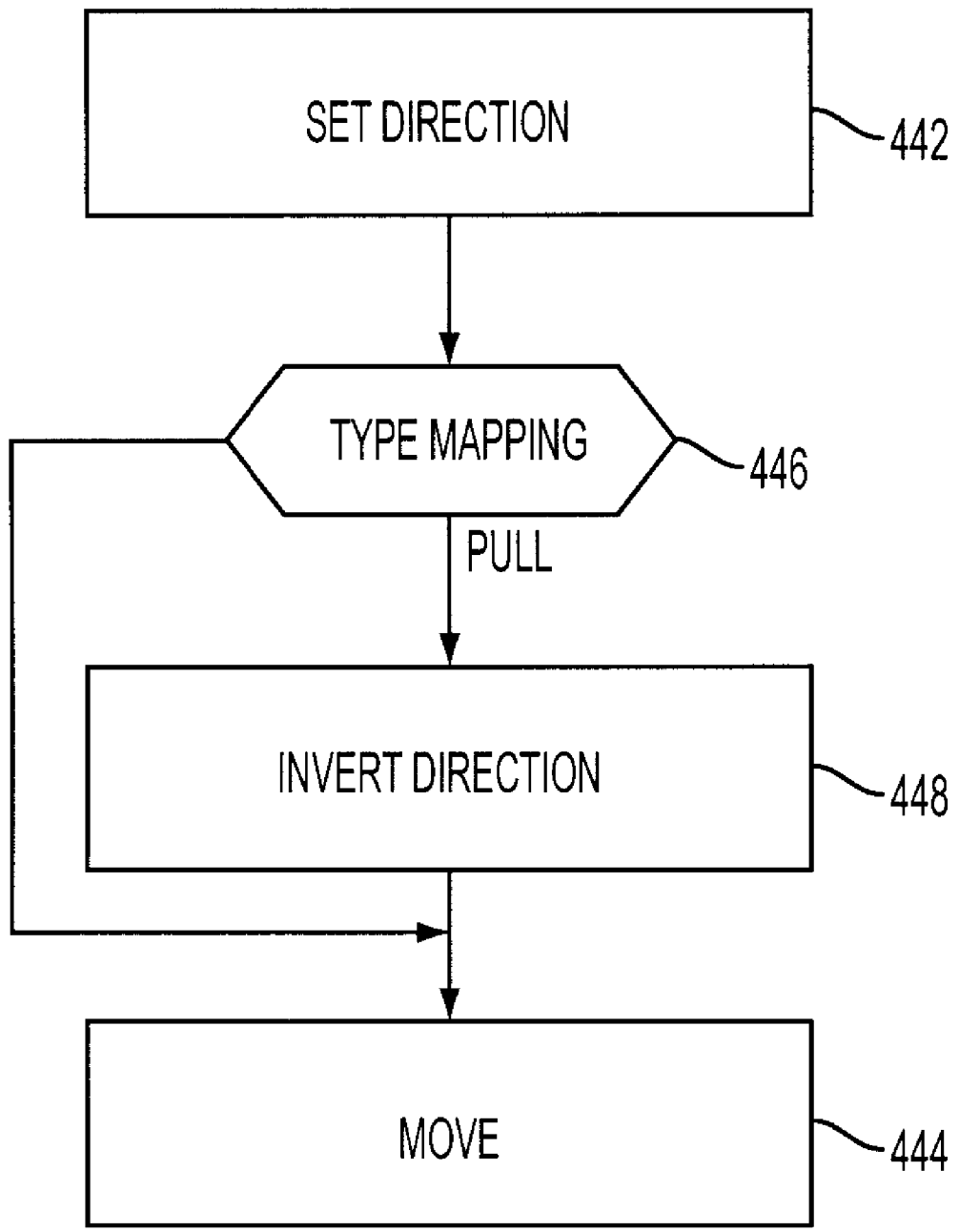
FIG. 13 shows pull mapping processing.

During the typical surface following processing as discussed in the related application, the system sets 442 the direction of the moved view to the direction of the selected closest ray and then moves 444 the view point along the newly set direction such that it is again the specified distance from the model. To allow for the different types of mapping discussed above, between the these operations, as depicted in FIG. 13, the system determines 446 the type of mapping that the user has set, and if the mapping is pull mapping, the direction is inverted 448.

Still, during a single click-drag-release input event series, a discrepancy can occur between the direction that the input device is moving and the intended camera motion in the scene. For example, for the camera motion shown in FIG. 7, the user would move the mouse down until they reached the North Pole, but continuing to move down would do nothing. To move down the other side, the user would have to move the mouse in an upward direction. This can make the user feel as though they are "stuck" and this can be fairly confusing. To fix this discrepancy, the present invention preferably uses two up-models: one for internal calculations and one for display to the user. Internally, the local up model is used, which will move continuously across the top of the globe in a single drag motion without getting stuck, as shown in FIG. 8. However, the "up" effect that the user sees may be any one of the four methods described above. This is accomplished by applying the local model to the camera position and orientation, followed by the application of the chosen up model. As this update is applied during every mouse-move event, the user only feels the effect of the chosen up model.

An appropriate choice for the up-vector model by the user may be highly content dependent and may be a user preference or may be uniquely associated with each model in a scene.

This basic algorithm discussed in the related application handles simple convex surfaces, slightly concave surfaces, and jumps across gaps or holes. However, the true closest point may be outside the current field of view (FOV) or may even be behind the camera. In these cases, turning the camera to immediately face the new closest point would be quite disorienting and may result in some undesirable effects. This can occur if the object has protrusions, or cavities. When gliding over a cavity, for example, the closest point can jump from one edge of the cavity to the other. To solve this problem, after the camera is turned toward the surface and the distance to the object is adjusted as discussed in the related application referenced above, the present invention clips the final distance traveled (of both the eye and the look-at point) to minimize these effects, slowly turning the camera to the intended position.

Specifically, to maintain smooth camera motion, the clipping looks at the vectors (see FIG. 14) from the old closest point to the new closest point ($L_0L_2$) and from the old eye position to the new eye position ($E_0E_2$). The system then clips these vectors to the length $\delta$ of the input vector i generated by the mouse move. This creates the final eye to look-at vector $E_3L_3$.

Figure 15:
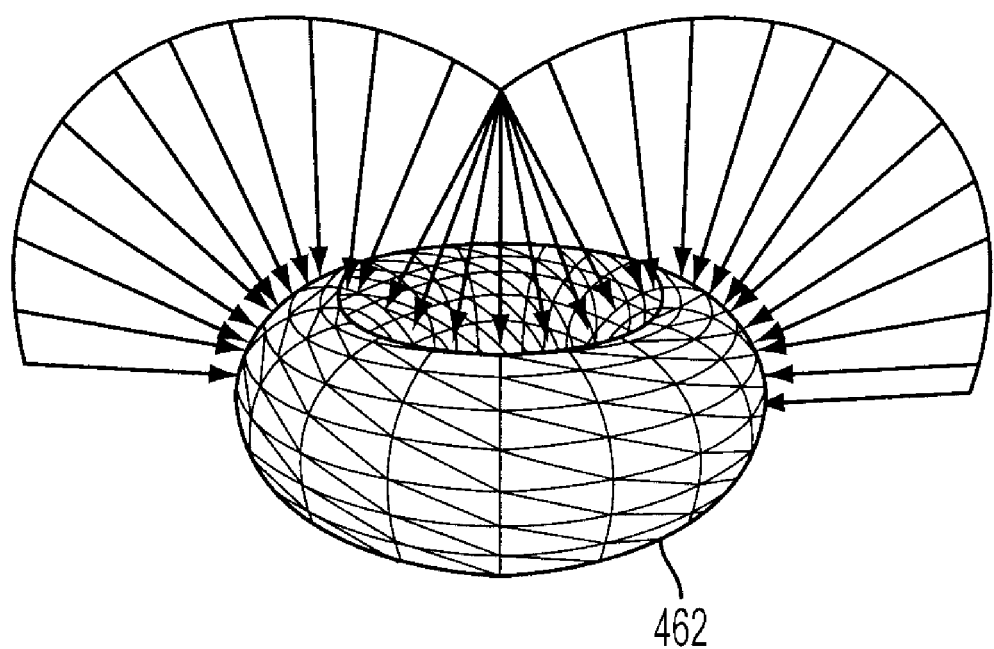
FIG. 15 shows an effect of clipping.

This motion-clipping step handles sharp camera turns and jumps across holes in an object or jumps across gaps to other objects. FIG. 15 shows the invention camera path while moving across the top of a torus (from left to right). Note how extra steps are generated across the hole in the torus 462, when the closest point is on the right-hand side, to smoothly turn toward the other side of the torus 462 to continue around it.

Figure 16:
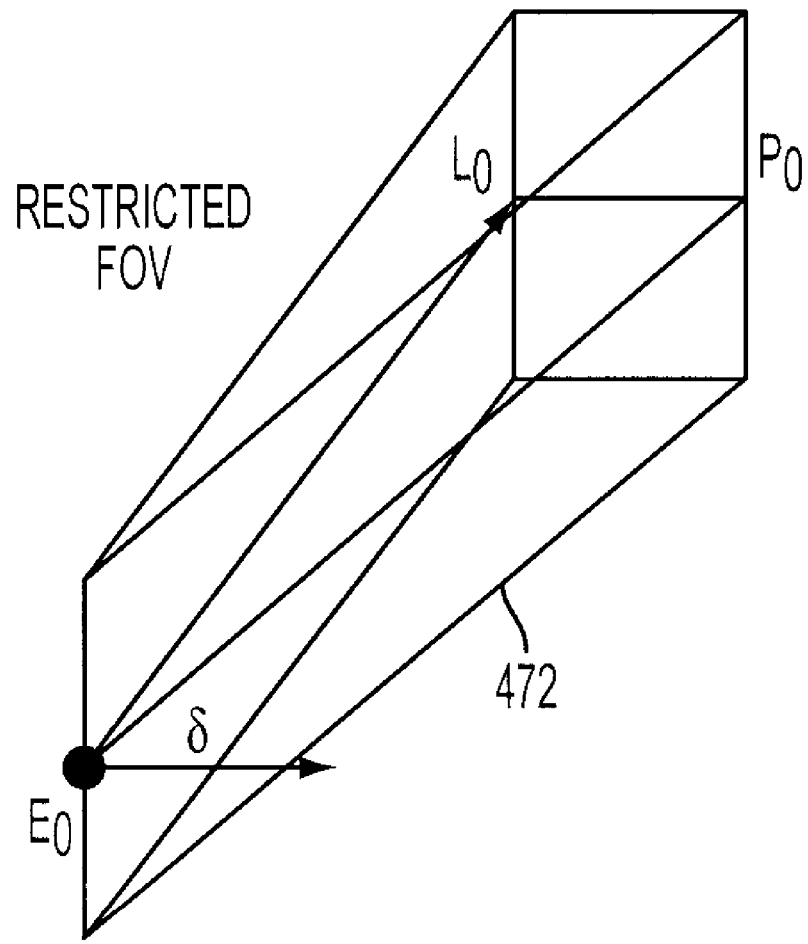
FIG. 16 shows a surface restricted field of view.

However, the camera motion shown in FIG. 15 can use an additional constraint. At the point where the camera is directly over the center of the torus, there are an infinite number of solutions when searching for the closest point. To resolve cases such as this, and to favor the user input, a restricted FOV constraint is added to only look for the closest point in the general direction of the input vector (see FIG. 16). There are two inputs to this constraint: the input vector i and the angle of the field of view $\beta$. Preferably, $\beta$ is fixed at 45°, but could be based on the view frustum. $P_0$ is the point along the vector formed by adding i to $L_0$ and ensuring $L_0E_0P_0$ is $\frac{1}{2}\beta$. All geometry outside the triangular wedge 472 determined by $E_0L_0P_0$, with a thickness of $2\delta$ and a length extending infinitely away from $E_0$, is disregarded during the search for the closest point to $E_0$.

Figure 17:
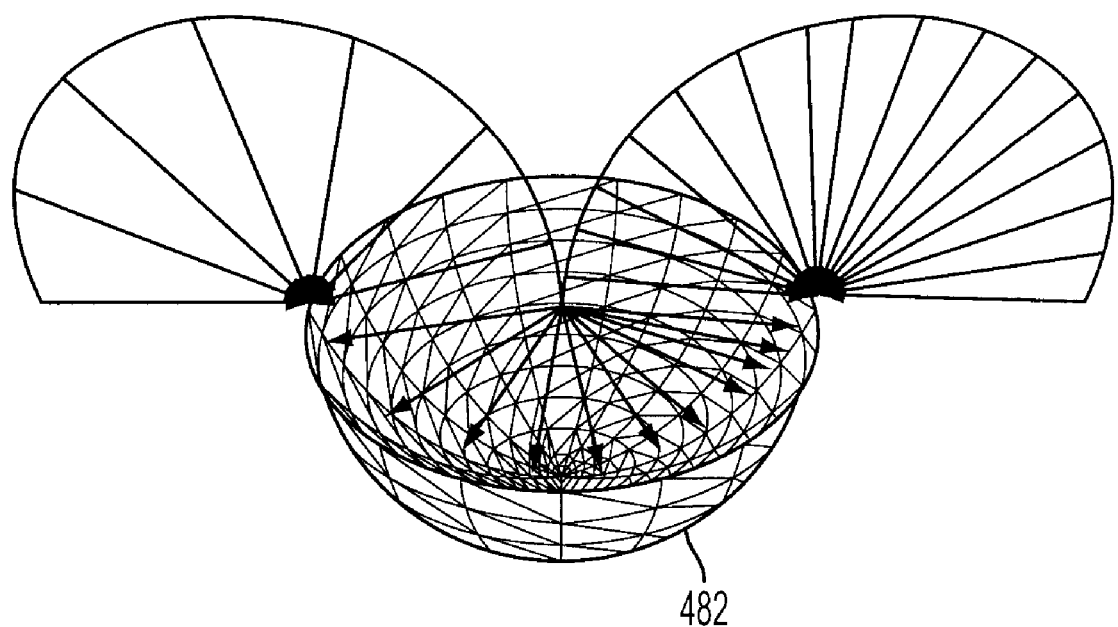
FIG. 17 shows motion through a concave surface.

This constraint helps the present invention to handle a number of situations. In the torus example, a new closest point is found directly across the hole and the motion clipping turns the camera toward it. In concave shapes 482 (see FIG. 17), where again, an infinite number of points are all equally close to the eye position, the user input helps to uniquely select a subset of results.

The restricted FOV for searching taken together with the motion clipping, handle the cases where there are multiple solutions for a closest point thereby providing the expected camera motion.

Figure 18:
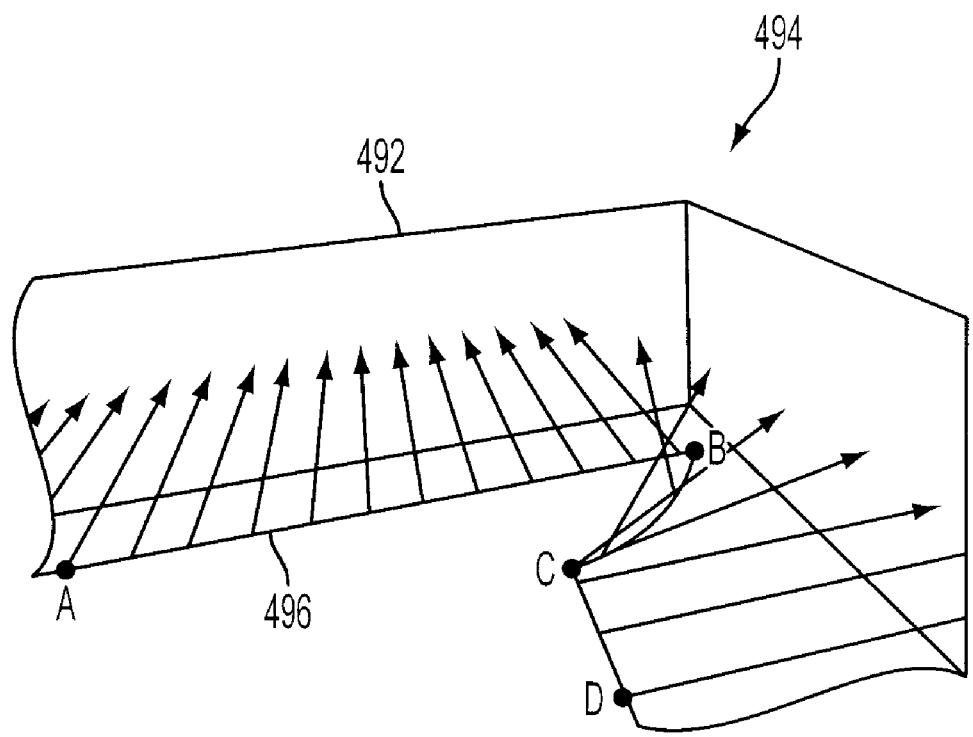
FIG. 18 illustrates a corner hook.

While the basic camera update operations discussed above and in the related application generate smooth camera motion paths, tight corners can create hooks in the path that could be avoided. The problem is caused by the restricted search FOV that prevents the algorithm from finding an upcoming corner. For example, when moving right along a wall 492 towards a corner 494, the system looks directly ahead at the wall 492 while panning right. However, the restricted FOV prevents seeing the approaching corner. The corner will eventually be found but this will push the camera back to the fixed distance from the surface effectively generating a hook in the camera path 496 as shown in FIG. 18 where the hook B-C in the camera motion path 496 occurs when turning in a corner while moving left to right (from A to D).

Figure 19:
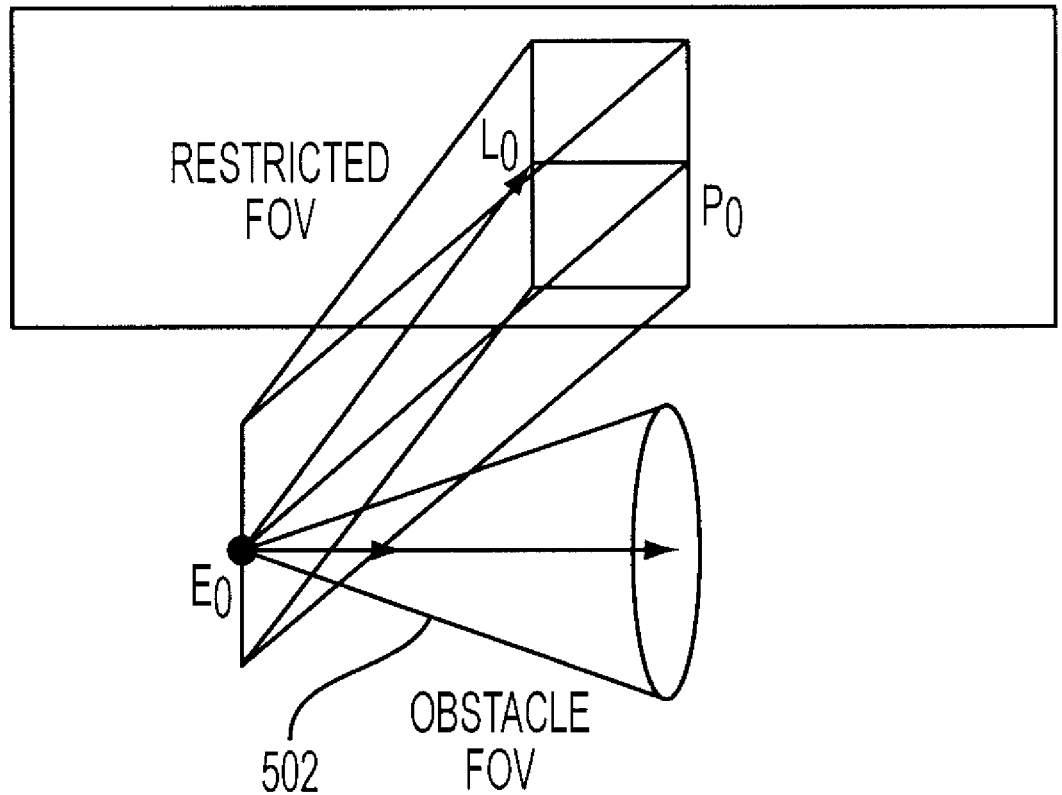
FIG. 19 shows a restricted surface field of view and an obstacle field of view.

To achieve the preferred trajectory, the present invention includes a second FOV 502 that searches for obstacles in the direction of motion as depicted in FIG. 19. The search for the closest point then includes both the restricted search FOV 492 and the obstacle FOV 502. The closest point in either FOV will be considered to be the target point that we would like to veer towards.

Figure 20:
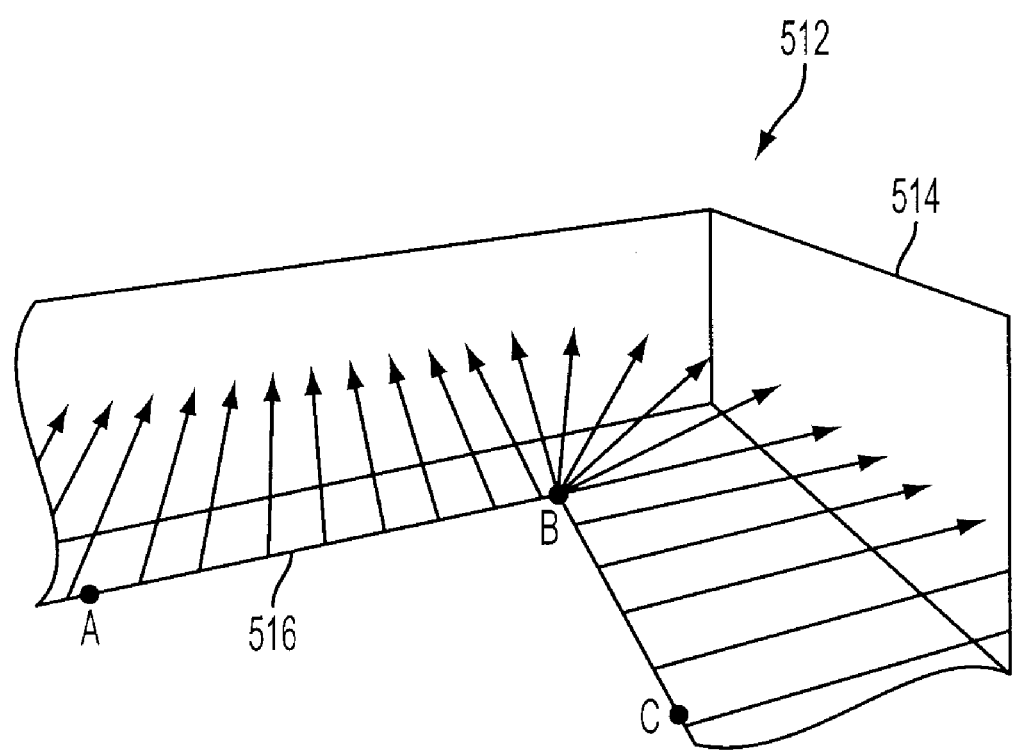
FIG. 20 shows using the obstacle field of view.

With the motion direction FOV 502, when a corner 512 is reached, the camera correctly turns in the direction of the input until it continues along the next wall 514 as shown in FIG. 20. The imminent collision with the wall is detected and the closest point will then be contained on that wall. Several steps are made while the camera turns toward it after which the camera carries on normally. As a result, there is no hook in camera motion path 516 when turning in a corner 512, while moving left to right (from A to C).

Figure 21:
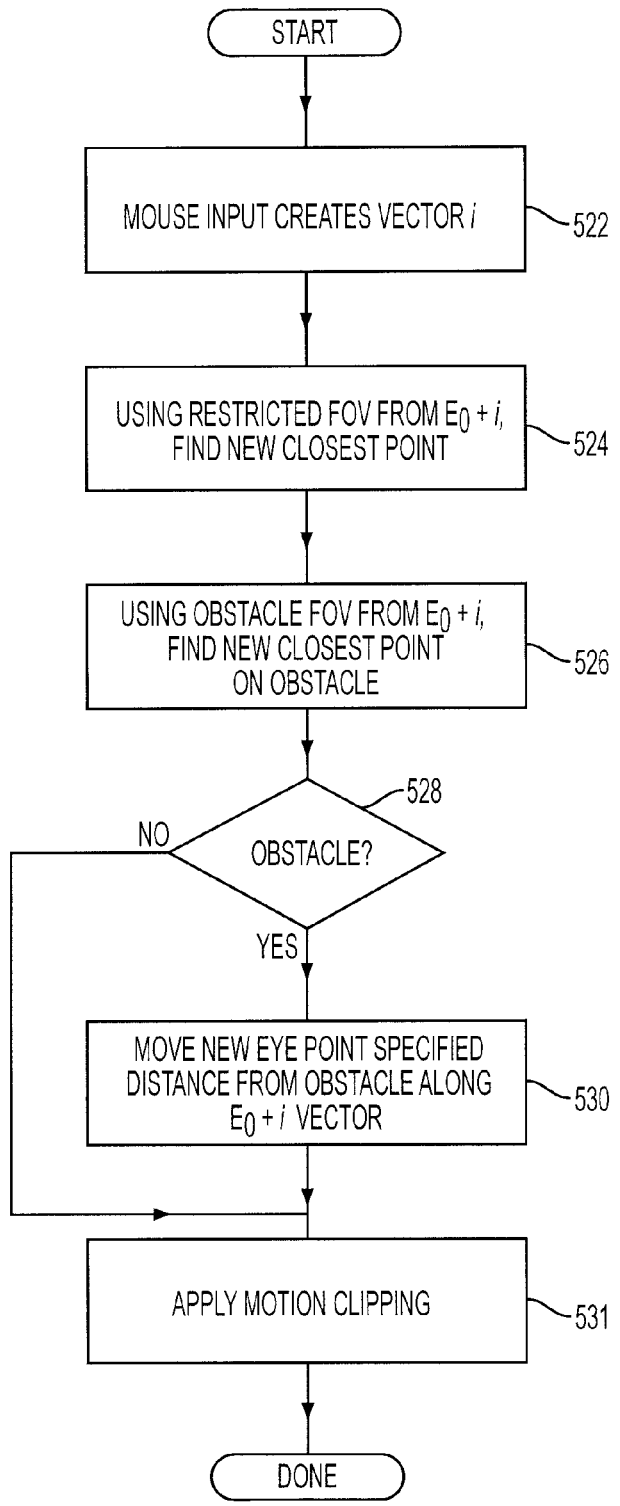
FIG. 21 shows obstacle processing.

FIG. 21 illustrates how the obstacle avoidance process of the present invention occurs. First, the user moves the mouse and the input vector "i" is created 522. Using the restricted field of view (FOV) of the object surface, which is being followed, a new closest point is found 524. The obstacle FOV is then used to find 526 the closest point of any obstacle. If an obstacle is detected 528, the eye point is moved 530 and motion clipping is then applied 531.

Figure 22:
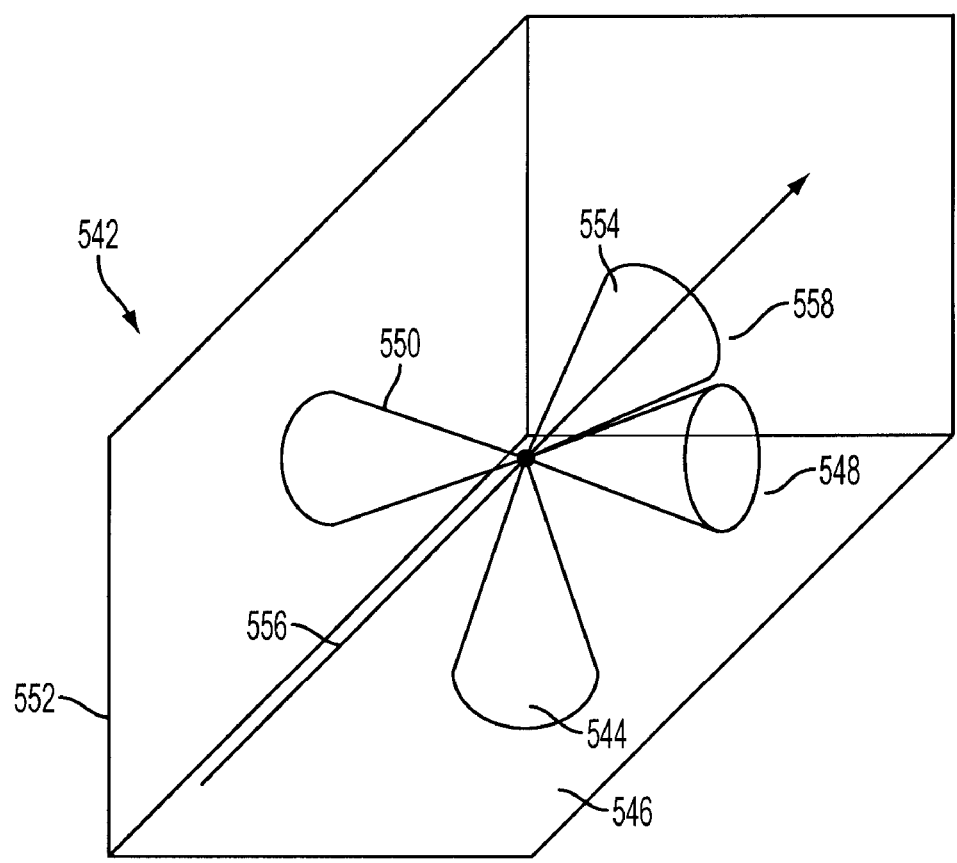
FIG. 22 depicts multiple fields of view.

A single object FOV and a single obstacle FOV have been discussed for controlling the camera path. However, additional obstacle FOVs may be used, such as an FOV that would detect a protrusion coming from behind the camera. Other constraints may be added such as a "distance from floor" constraint used for an architectural walk-through. In the discussion above, the view of the scene by the camera is of the object when the camera is performing surface following. However, the view by the camera need not be of the object or surface that is being followed. For example, in architectural walk-through of a virtual room 542 (see FIG. 22) of a virtual building, the surface-following FOV 544 can maintain the camera a predetermined distance off a floor 546 of the virtual building, obstacle FOVs 548 and 550 pointing to the sides can prevent the camera from colliding with side walls, such as side wall 552, a direction of travel FOV 554 can prevent collision with obstacles in the direction of travel 556 while the view 558 of the camera can be of the interior of the building, such as a view parallel with the floor and along the direction of travel. The view could also be controllable by the user during navigation, such as by allowing the user to point the camera up at the ceiling of the room. The side FOVs 548 and 550 allow easy navigation down a center of a hallway.

Figure 23:
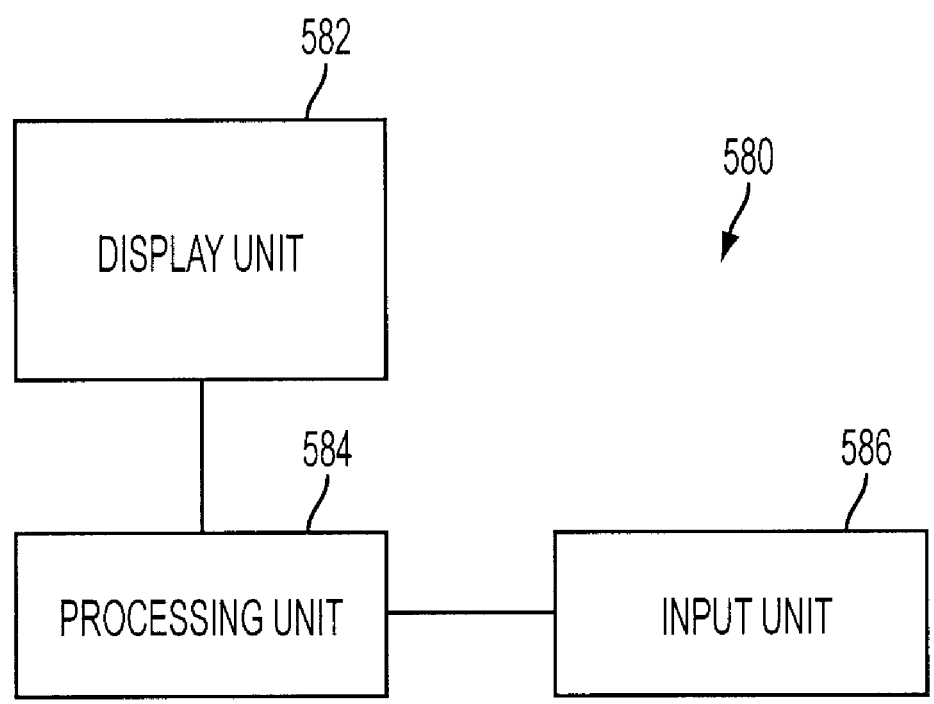
FIG. 23 depicts system hardware.

The present invention is included in a system 580, such as depicted in FIG. 23, which includes a display 582 upon which an output of the present invention may be displayed. A computer 584, preferably of high performance workstation type, performs the processes described herein and an input device 586, such as a mouse or stylus with pad, is used to control functionality described herein. The system 580 also includes storage (not shown), such as disc storage and RAM in which the processes of the present invention can be stored and on which the processes can be distributed. The processes can also be distributed via a network, such as the Internet.

The system also includes permanent or removable storage, such as magnetic and optical discs, RAM, ROM, etc. on which the process and data structures of the present invention can be stored and distributed. The processes can also be distributed via, for example, downloading over a network such as the Internet.

The present invention has been described with respect to computationally finding a closest point. It is possible to use other methods such as a hardware-generated z-buffer, may be used to find the closest point. A smoothing pass can also be performed on the eye and look-at points to further smooth the resulting camera motion. The system can include other types of interactions, for example, the user may be allowed to transiently engage a "look-around" mode, switching back to HoverCam after a drag operation.

Additional information related to the present invention can be found in Khan, Azam et al., "Interaction: HoverCam: interactive 3D navigation for proximal object inspection", Proceedings of the 2005 symposium on Interactive 3D graphics and games, April 2005 incorporated by reference herein.

A compact disc is included herewith and incorporated by reference herein having thereon a video that shows features of the present invention and can be played using Windows Media Player TM.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of viewing or navigating a model comprised of curved or non-axis-aligned flat surfaces, said method comprising
automatically moving a camera, according to interactively generated two-dimensional data having a facing direction, from a current position relative to the model, to a new position relative to the model;
determining whether the new position is within an outer distance and an inner distance of the model;
at the new position, when the camera does not face the model and when the camera is within the outer distance, automatically reorienting the camera to the toward the model by weighting the facing direction and a direction of the model at the new position; and
at both positions, when the camera does not face the model and when the camera is within the inner distance, automatically reorienting the camera directly to the model responsive to the direction.

2. A method of viewing or navigating a model comprised of curved or non-axis-aligned flat surfaces, said method comprising
automatically moving a camera, according to interactively generated two-dimensional data having a facing direction, from a current position relative to the model, to a new position relative to the model;
determining whether the new position is within an outer distance and an inner distance of the model;
at the new position, when the camera does not face the model and when the camera is within the outer distance, automatically reorienting the camera to the toward the model by weighting the facing direction and a direction of the model at the new position;
at both positions, when the camera does not face the model and when the camera is within the inner distance, automatically reorienting the camera directly to the model responsive to the direction, comprising:
generating a sphere tree of the model;
viewing a surface of the model from an initial viewpoint with an initial view direction;
generating a single two-dimensional vector by moving a mouse;
translating, according to the vector, the initial viewpoint to a next viewpoint in a plane normal to the view direction and intersecting the initial viewpoint;
automatically finding a point of the surface that is closest to the next view point, comprising:
determining a field of view of the next viewpoint;
determining spheres of the tree within the field of view; and
evaluating polygons of the spheres for the closest point; and
automatically setting a next view direction to a direction from the next viewpoint to the closest surface point;
allowing a user to specify an up direction in a scene;
maintaining a view of the scene according to the up direction; and
positioning the view of the surface responsive to an obstacle.

* * * * *